United States Patent [19]

Maiershofer et al.

[11] 3,777,965

[45] Dec. 11, 1973

[54] TAPE DRIVE MECHANISM

[75] Inventors: Helmut C. Maiershofer, Scottsdale; Walter J. Noble, Mesa, both of Ariz.

[73] Assignee: Motorola, Inc., Franklin Park, Ill.

[22] Filed: Aug. 24, 1972

[21] Appl. No.: 283,483

[52] U.S. Cl. .................. 226/183, 226/195, 226/194, 226/187

[51] Int. Cl. .............................................. B65h 17/22

[58] Field of Search .................... 226/181, 183, 188, 226/195, 194, 187; 242/55.19, 55.17, 55.18, 55.21

[56] References Cited

UNITED STATES PATENTS

| | | | |
|---|---|---|---|
| 3,099,376 | 7/1963 | Kennedy | 226/181 X |
| 3,402,868 | 9/1968 | Hammond | 226/181 X |
| 3,219,246 | 11/1965 | Kihara | 226/181 |
| 3,282,486 | 11/1966 | DeMoss | 226/181 |

*Primary Examiner*—Allen N. Knowles
*Attorney*—Victor Myer

[57] ABSTRACT

There is disclosed a tape drive mechanism for a continuous tape wherein two pressure rollers, one on each side of the driving capstan, are formed of non compliant material and engage the non compliant surface of the capstan through the intervening tape. The use of all non compliant surfaces prevents deformation thereof and avoids the development of wows in the recording.

The bearing of the roller on the input side of the capstan is a friction bearing, and the bearing on the output side of the capstan is an antifriction bearing such as a ball bearing. This creates a differential friction drive which causes a slight drag on the tape input side and thus eliminates tape overrun when the recorder is turned off.

The use of a relatively few injection molded parts results in a low cost and simple device.

8 Claims, 4 Drawing Figures

TAPE DRIVE MECHANISM

GOVERNMENT CONTRACTS

The invention herein claimed was made in the course of, or under contract with the Department of the Navy.

BACKGROUND OF THE INVENTION

This invention relates to tape recorders and drive mechanisms for driving the tape, more particularly to such drive mechanisms whereby wows and other distortions in the recording or reproducing are eliminated and it is an object of the invention to provide improved tape drive mechanisms of this nature.

It is a further object of the invention to provide improved drive mechanisms of the nature indicated wherein tape overrun, when the recorder is turned off, is eliminated.

While not limited thereto, the invention has ready application to a low cost, pocket size, endless tape, reel recorder having the foregoing advantages.

The presence of wows which is a distortion in the sound recorded on a tape due to small undesired variations in speed and occur because of flat spots on the rollers which engage the tape and the driving capstan. The flat spots develop because the surfaces of the rollers, or of the capstan, or both, are made of compliant material such as rubber, or synthetics, and thus deform under the engaging pressure while the recorder is not running. The deformations, or flat spots, in the compliant material do not disappear immediately after the recorder is turned on because it takes some time for the compliant material to recover its initial roundness. In some instances the flat spots may never be eliminated once they have been acquired. According to the invention, the presence of wows, as described, is eliminated by using non compliant rollers and a non compliant capstan whereby no flat spots develop. Typically, the rollers may be of any metal for example, steel. In order not to deform or damage the tape itself the rollers are urged against the tape and against the surface of the capstan in a relatively light manner.

Tape overrun may occur when the recorder is turned from on to off. That is to say, the tape continues to move through the mechanism, but since the take up reel, for example, is no longer turning or turns at a different speed, the continued motion of the tape causes it to spill off the rollers and accumulate in the mechanism. When the recorder starts up again the tape slack is taken up first, before effective recording can begin. In the process of taking up the slack or in the process of its developing in the first instance, the tape may become tangled with the resultant loss of time of use.

Hence, it is a further object of the invention to provide improved mechanism of the nature indicated which will eliminate the foregoing difficulty in a simple and inexpensive manner.

According to the invention the two pressure rollers, which are idler rollers, engage the tape and the capstan to cause a large angle of engagement of the tape with the capstan. The friction of the roller on its bearing on the input tape side of the capstan is greater than the friction of the roller on its bearing on the output side of the capstan. Thus a differential friction mechanism is utilized to create a slight drag on the tape as it moves through the mechanism. This causes a slight tension in the tape which results in there not being any tape spill off when the recorder is turned off.

Accordingly, it is a further object of the invention to provide an improved tape recorder of the nature indicated which will eliminate, in an inexpensive manner, the tendency of the tape to overrun.

It is a further object of the invention to provide a tape recorder of the nature indicated which is essentially of pocket size, has a small number of parts, is simple to manufacture and reliable in operation.

Further objects and advantages of the invention will become apparent as the description proceeds.

BRIEF DESCRIPTION OF THE INVENTION

In carrying out the invention in one form apparatus for driving flexible tape means is provided comprising in combination a non compliant drive capstan supported for rotational movement about its central axis and adapted to engage such tape around a portion of its periphery for driving such tape, said capstan having an input side and an output side for such tape means in moving around said capstan, a first pressure roller on said input side and having a non compliant peripheral surface adapted to engage such tape and hold the same against the periphery of said drive capstan, a friction bearing for rotatably supporting said first roller, a second pressure roller on said output side and having a non compliant peripheral surface adapted to engage such tape and hold the same against the periphery of said drive capstan, and an antifriction bearing for rotatably supporting said second roller.

In carrying out the invention in another form the friction bearing comprises a sleeve bearing and the antifriction bearing comprises a ball bearing.

DESCRIPTION OF THE PREFERRED EMBODIMENTS

Figure 1:
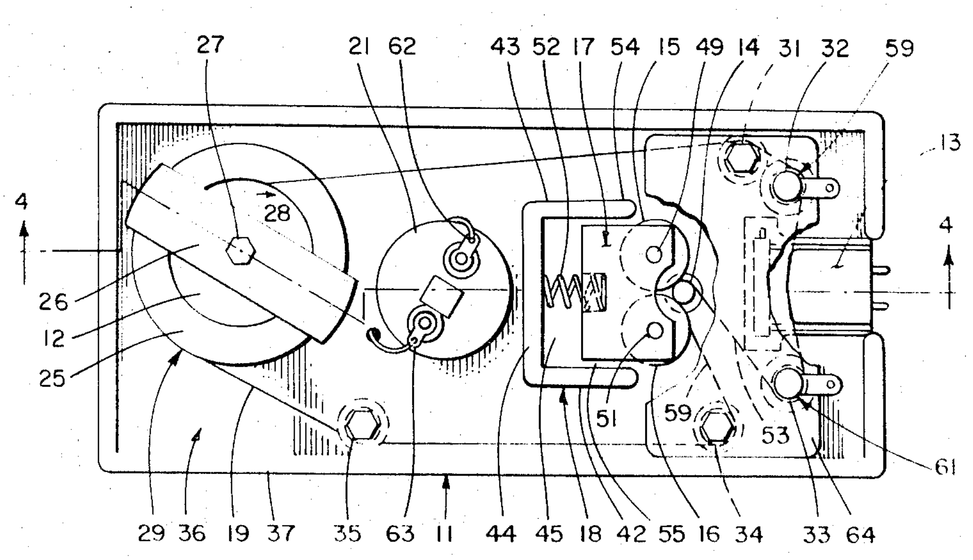
FIG. 1 is a top plan view partially broken away of a recorder according to the invention.
Figure 2:
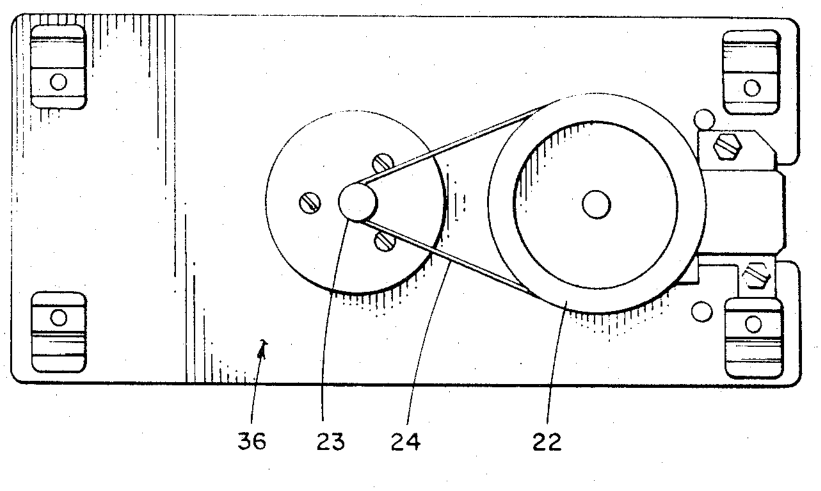
FIG. 2 is a bottom view of the recorder shown in FIG. 1.

Referring to the drawings there is shown a tape recorder 10 according to the invention including a frame member 11, a tape reel 12, a recording and reproducing head 13, a drive capstan 14, pressure rollers 15 and 16 supported on a carrier member 17, guide means 18 for carrier 17, and endless tape 19, a drive motor 21, a pulley 22 mounted on the shaft of capstan 14, a drive pulley 23 mounted on the shaft of motor 21 and a driving belt 24.

The endless tape 19 of which there is an inventory 25 is disposed on the reel 12 which is held to the frame member 11 by a bracket 26 and screw 27 as shown. The tape 19 pays out, when the recorder is operating, from the center of the tape inventory 25 at the point 28 and feeds on to the tape inventory 25 at point 29. The tape moves around the guide posts 31 and 32, past the recording head 13, as shown, around the guide post 33, to the capstan 14 on the input side thereof, around the capstan to the output side thereof, and around a guide post 34 and a guide post 35 to the feed in point 29 of the tape inventory 25.

The frame member 11 which may be an injection molded part in one piece includes a floor or base member 36, an upstanding ledge 37 extending around the base member 36, an integrally molded depressed part 38 within which the motor 21 is received, a boss 39 which provides a bearing surface for the shaft of capstan 14 and a boss 41 for holding the reel 12. The ledge 37 provides strength and rigidity to the floor or base portion 36 of the frame member. Because of the injection molding process by which the frame member may be made, the frame is low cost and simple to make and efficient in operation. The guide posts 31, 34 and 35 may be integrally molded along with the frame. The guide posts 32 and 33 may be of metal for a purpose to be described.

Also formed integrally with the base portion 36 is the guide member 18 which may be in the form of a channel as seen best in FIG. 1, the channel having legs 42 and 43 and a connecting base 44.

Received within the opening 45 formed by the sides 42, 43 and the base 44 is the carrier 17 which holds the pressure rollers 15 and 16. The carrier 17 may also be a molded part made of any suitable synthetic material, for example, and includes a base portion 46 and two leg members 47 and 48 (FIG. 4) which include openings for receiving the shafts 49 and 51 upon which are supported rotatably, respectfully, the pressure rollers 15 and 16. The carrier 17 is biased, that is, urged resiliently by mean of a spring 52 so that the rollers 15 and 16 are urged into contact with the capstan 14, the tape 19 being disposed between the outer peripheries of the capstan 14 and the rollers 15 and 16. The rollers 15 and 16 are so mounted that their adjacent surfaces in the vicinity of the capstan 14 are close together but do not touch as will be understood.

The input angle of the tape 19, that is, the direction of the tape run at 53 relative to longitudinal axis of the recorder is determined by the location of the capstan 14 and the guide post 33 and is an acute angle. The output angle of the tape 19, that is, the direction of the tape run 59 is determined by the location of the guide post 34 and the capstan 14. The angle of the tape run 59 on the output side of the capstan 14 relative to that of the run 53 is such as to give the tape a large wrap around angle on the capstan for greater gripping surface and therefore improved driving. The periphery of roller 15 engages the surface of capstan 14 to the intervening tape and the roller 16 likewise engages the surface of the capstan 14 to the intervening tape.

The carrier 17 is loosely, i.e., floatingly, received between the guide members 42 and 43 as may be visualized by the gaps 54 and 55 so that the spring 52 in urging the carrier 17 forwardly enables the rollers 15 and 16 to engage the tape and capstan 14 and in so doing enables the carrier and rollers to adjust to the surface of the capstan 14 and the tape moving therearound. The spring 52 is chosen so that pressure exerted against the tape in moving around the capstan is not any greater than the tape will well withstand without becoming deformed or damaged.

Figure 3:
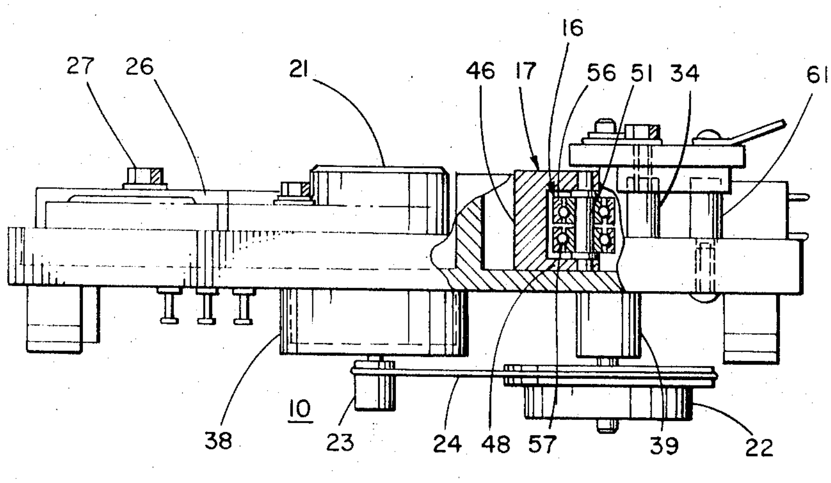
FIG. 3 is a side view partially broken away of the recorder shown in FIG. 1 and, FIG. 4 is a sectional view taken substantially of the direction of the arrows for four of FIG. 1.

Referring to FIG. 3 wherein the carrier 17 is shown in sectional view the roller 16 is shown as comprising a pair of roller, or ball, bearings 56 and 57 supported on the shaft 51. The bearings 56 and 57 may be standard ball bearings available on the open market and chosen to be of the diameter desired and supported on the shaft 51 in the customary fashion. The ball bearings 56 and 57 are of the antifriction variety and therefore exhibit very little friction when they rotate under the influence of the tape moving along their outer races.

Figure 4:
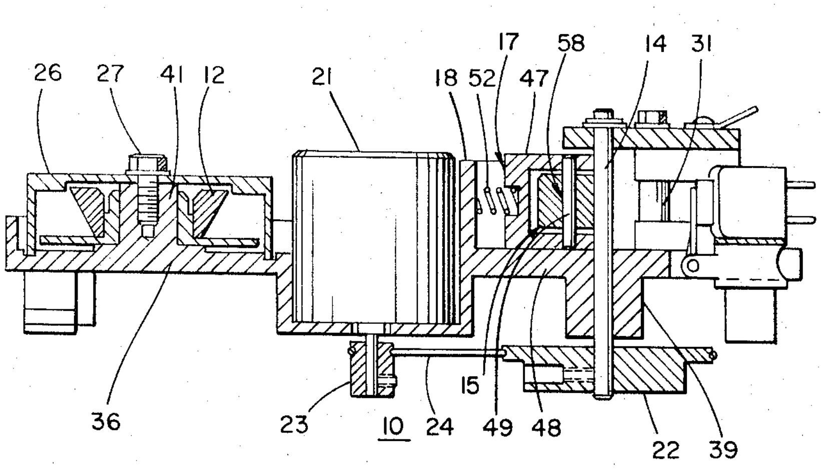

Referring to FIG. 4, it will be seen that the legs 47 and 48 of the carrier 17 also support the roller 15 on bearing 58 which may be the surface between the shaft 49 and the bore of the roller. The bearing 58 is of the ordinary friction variety referred to frequently as a sleeve bearing and thus exhibits substantially greater friction than the antifriction bearings 56 and 57, which may be considered one roller.

When the tape is pulled through, moving in the direction shown by the arrow A in FIG. 1, the tape run 53 moves around the capstan 14 exiting as tape run 59. Tension or pulling force, of course, is necessary to move the tape through runs 53 and 59, and since the roller 15 is rotating on an ordinary friction bearing 58 the resistance to movement of the tape on the input side of the capstan is substantially greater than that exhibited on the output side as determined by the ball bearings 56 and 57 for roller 16. Thus there is a drag on the tape which prevents it from spilling over to the output side when the recorder is turned off. The arrangement of the greater friction on the input side for roller 15 and a lesser friction for the output side for roller 16 constitutes a differential friction drive. Since both sleeve bearing drives and ball bearing drives are inexpensive, the cost of the tape drive described is very low.

The periphery of pressure roller 15 is of metal and is therefore non compliant, the capstan 14 is metal and therefore non compliant and the outer races of ball bearings 56 and 57 are of metal and therefore non compliant. By virtue of the non compliant nature of the surfaces indicated there will be no deformation of the peripheries of the capstan 14 and the rollers 15 and 16. Thus the tape 19 may be started and stopped and allowed to sit for long periods of time either in a place where operations are to take place, or on the shelf unused, without the rollers and capstans developing flat spots or deformations which would cause wows or other sound distortions when material is being recorded or played back.

When the tape 19 is disposed around the various guide rollers and capstans and on the inventory reel 12, there is only such tension therein as is necessary to the operation whereby the tape may feed off the pay off reel 12 at point 28 and feed in on the inventory of tape 25 at point 29. It has been found that a continuous tape of the kind illustrated will pay off from a point such as 28 without any substantial drag upon the tape.

For tapes as to which it is desired to know when the end of message has been received, contacts 59 and 61 shown by the arrows bearing the reference characters indicated are formed by the metallic guides 32 and 33 respectively. The end of the message portion of the tape may be metallized and when the metallized portion extends across the contact points 59 and 61, appropriate contact is made (not shown) to stop the motor 21. Energization may be supplied to the terminals 62 and 63 of the motor in any suitable manner (not shown).

The various shafts and guide posts are held in position by means of a cover plate 64 which may be screwed to the base member 11 in any suitable manner.

The pulley 22 attached to the shaft of capstan 14 constitutes a fly wheel for eliminating minor speed variations of the capstan 14 when the pulley 22 is being driven by the belt 24. The capstan, of course, rotates on its central axis as do the various rollers.

It will be evident that there is a very small number of piece parts inasmuch as substantially all of the supporting structure is part of a single piece which may be formed by injection molding as described.

We claim:

1. Apparatus for driving flexible webb means comprising in combination:

a frame member, a non compliant drive capstan supported on said frame member for rotational movement about its central axis and adapted to have such webb around a portion of its periphery for driving such webb, said capstan having an input side and an output side for such webb means in moving around said capstan, carrier means, a first pressure roller mounted on said carrier means at said input side, said first pressure roller having a non compliant peripheral surface adapted to engage such webb and hold the same against the periphery of said capstan, a second pressure roller mounted on said carrier means at said output side, said second pressure roller having a non compliant peripheral surface adapted to engage such webb and hold the same against the periphery of said capstan, and differential friction bearing means associated with said first and said second pressure rollers providing greater friction at said first pressure roller.

2. The apparatus according to claim 1 including means for resiliently urging said carrier means and the pressure rollers thereon toward said capstan.

3. The apparatus according to claim 2 wherein said differential friction bearing means comprises sleeve bearing means for said first pressure roller, and ball bearing means for said second pressure roller.

4. The apparatus according to claim 3 including guide means disposed on said frame member, and said carrier means is floatingly disposed in said guide means.

5. The apparatus according to claim 2 wherein said resilient urging means comprises a spring.

6. The apparatus according to claim 4 wherein said frame and said guide means comprise an integrally molded part, and said carrier means comprises a molded part.

7. Apparatus for driving a continuous flexible tape comprising in combination:

a synthetic molded frame member, a tape support reel member supported at one end of said frame member, said reel member being adapted for center feed out of tape and circumferential feed in of tape, a non compliant drive capstan supported on said frame member for rotational movement about its central axis and adapted to have such tape around a portion of its periphery for driving said tape, said capstan having an input side and an output side for said tape means in moving around said capstan, first guide means supported on said frame member for directing said tape means from thee center feed out to said input side and from said output side to said circumferential feed in, second guide means integrally molded with said frame member, carrier means floatingly supported in said second guide means, a first pressure roller including a friction bearing mounted said carrier means at said input side, said first pressure roller having a non compliant peripheral surface adapted to engage such tape and hold the same against the periphery of said capstan, a second pressure roller including an antifriction bearing mounted on said carrier means at said output side, said second pressure roller having a non compliant peripheral surface adapted to engage said webb and hold the same against the periphery of said capstan, and resilient means in said second guide means for urging said carrier and said first and second pressure rollers toward such webb and into engagement with such capstan.

8. The apparatus according to claim 7 wherein said friction bearing comprises a sleeve bearing and said antifriction bearing comprises a ball bearing.

* * * * *